United States Patent [19]

Ishikawa et al.

[11] 4,356,243

[45] Oct. 26, 1982

[54] ELECTROPHOTOGRAPHIC MEDIA WITH BENZOXAZOLE GROUP CONTAINING DIS-AZO COMPOUND

[75] Inventors: Shozo Ishikawa; Kazuharu Katagiri; Katsunori Watanabe; Shigeto Ohta; Makoto Kitahara, all of Tokyo, Japan

[73] Assignee: Copyer Co., Ltd., Tokyo, Japan

[21] Appl. No.: 235,793

[22] Filed: Feb. 19, 1981

[30] Foreign Application Priority Data

Feb. 19, 1980 [JP] Japan .................................. 55-18574

[51] Int. Cl.$^3$ .............................................. G03G 5/06
[52] U.S. Cl. .................................. 430/58; 430/77; 430/79; 260/157
[58] Field of Search ........................ 430/58, 77, 79; 260/157

[56]  References Cited

U.S. PATENT DOCUMENTS

| | | | |
|---|---|---|---|
| 4,024,125 | 5/1977 | Kunstman et al. ................. | 260/157 |
| 4,247,614 | 1/1981 | Ohta et al. ........................ | 430/58 X |
| 4,251,614 | 2/1981 | Sasaki et al. ...................... | 430/79 |
| 4,260,672 | 4/1981 | Sasaki et al. ...................... | 430/58 X |
| 4,278,747 | 7/1981 | Murayama et al. ............... | 430/79 X |
| 4,299,896 | 11/1981 | Hashimoto et al. ............... | 430/58 |

FOREIGN PATENT DOCUMENTS 1564083  4/1980  United Kingdom .

Primary Examiner—Roland E. Martin, Jr.
Attorney, Agent, or Firm—Sughrue, Mion, Zinn, Macpeak & Seas

[57]  ABSTRACT

An electrophotographic light-sensitive medium is described comprising at least an electrically conductive layer, a charge generation layer and a charge transport layer, the charge generation layer containing a dis-azo compound represented by Formula (1)

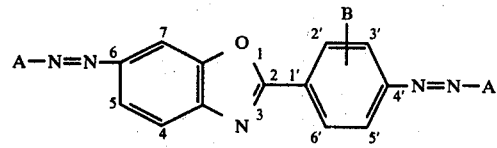

wherein A is a coupler having aromatic properties, and B is a group selected from hydrogen, halogen, lower alkyl having 1 to 4 carbon atoms and lower alkoxy having 1 to 4 carbon atoms.

16 Claims, No Drawings

ELECTROPHOTOGRAPHIC MEDIA WITH BENZOXAZOLE GROUP CONTAINING DIS-AZO COMPOUND

BACKGROUND OF THE INVENTION

This invention relates to an electrophotographic light-sensitive medium prepared using a novel dis-azo compound containing therein a benzoxazole ring.

Various types of light-sensitive media bearing an electrically conductive layer and an organic pigment-containing layer provided on the electrically conductive layer have heretofore been known, including:

(1) a light-sensitive medium as disclosed in Japanese Patent Publication No. 1667/1977 in which a layer prepared by dispersing a pigment in an insulative binder is provided on an electrically conductive layer;

(2) a light-sensitive medium as disclosed in Japanese Patent Application (OPI) Nos. 30328/1978 (corresponding to U.S. Pat. No. 3,894,868) and 18545/1972 (corresponding to U.S. Pat. No. 3,870,516) in which a layer prepared by dispersing a pigment in a charge transport substance or a charge transport medium comprising the charge transport substance and an insulative binder (which may also be a charge transport substance) is provided on an electrically conductive layer;

(3) a light-sensitive medium as disclosed in Japanese Patent Application (OPI) No. 105537/1974 (corresponding to U.S. Pat. No. 3,837,851) which comprises an electrically conductive layer, a charge generation layer containing a pigment, and a charge transport layer; and (4) a light-sensitive medium as disclosed in Japanese Patent Application (OPI) No. 91648/1974 and in which an organic pigment is added to a charge transfer complex.

As pigments for use in light-sensitive media, a number of pigments, such as phthalocyanine based pigment, polycyclic quinone based pigment, azo based pigment and quinacridone based pigment, have been proposed, but few of them have been put in practice.

The reason for this is that these organic photoconductive pigments are inferior in sensitivity, durability, etc., to inorganic pigments such as Se, CdS, ZnO, etc.

However, light-sensitive media prepared using inorganic photoconductive pigments also suffer from disadvantages.

For example, with a light-sensitive medium prepared using Se, crystallization of Se is accelerated by heat, moisture, dust, finger print, etc., and, in particular, when the atmospheric temperature of the light-sensitive medium exceeds about 40° C., the crystallization becomes significant, resulting in a reduction in charging properties and the formation of white spots in an image. Although Se-based light-sensitive medium can theoretically produce 30,000 to 50,000 copies, it often fails to produce so many copies because it is adversely influenced by the environmental conditions of the location where the copying machine in which it is used is placed.

In the case of a CdS-based light-sensitive medium covered with an insulative layer, its durability is nearly the same as that of the Se-based light-sensitive medium. Additionally, use of CdS results in deterioration of the moisture resistance of the CdS-based light-sensitive medium, and it is very difficult to improve this poor moisture resistance. At the present time, therefore, it is necessary to provide an auxiliary means, e.g., a heater.

With a ZnO-based light-sensitive medium, sensitization thereof is caused by the use of dyes exemplified by Rose Bengale and, therefore, problems such as deterioration due to corona charging and discoloration of the dye by light arise. At the present time, it is generally believed that only about 1,000 copies can be produced by the Se-based light-sensitive medium.

Furthermore, the Se-based light-sensitive medium is expensive, and causes pollution problems, as is also the case with the CdS-based light-sensitive medium.

The sensitivity of conventional light-sensitive media, when expressed as an exposure amount for half decay (E ½), is as follows: a Se-based light-sensitive medium which is not sensitized, about 15 lux.sec; a Se-based light-sensitive medium which is sensitized, about 4 to 8 lux.sec; a CdS-based light-sensitive medium, about the same as that of the sensitized Se-based light-sensitive medium; and a ZnO-based light-sensitive medium, about 7 to 12 lux.sec.

When the light-sensitive medium is used in a PPC (plane paper copior) copying machine (manufactured by Copyer Co., Ltd.), its sensitivity is desirably 20 lux.sec or less as E ½, whereas when used in a PPC copying machine whose rate of duplication is higher, its sensitivity is more desirably 15 lux.sec or less as E ½. Of course, light-sensitive media having lower sensitivities than above described can also be used, depending on the purpose for which they are used, i.e., cases where the light-sensitive medium is not necessary to be repeatedly used, such as, for example, cases where the light-sensitive medium is used as a coating paper and a toner image is directly formed on the coating paper in copying of a drawing, etc.

SUMMARY OF THE INVENTION

As a result of extensive investigation to overcome the above described defects of the conventional inorganic light-sensitive media, and to overcome the above described defects of the organic electrophotographic light-sensitive media heretofore proposed, it has now been found that a light-sensitive medium prepared using a dis-azo compound containing therein a benzoxazole ring has high sensitivity and durability to such an extent that it can satisfactorily be put into practical use, and that it overcomes disadvantages of the inorganic light-sensitive media, e.g., poor heat resistance (crystallization of Se), poor moisture resistance, discoloration by light, pollution, etc.

This invention, therefore, provides an electrophotographic light-sensitive medium comprising a light-sensitive layer containing a dis-azo compound represented by Formula (1)

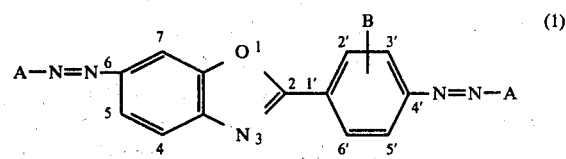

(1)

wherein A represents a coupler having aromatic properties, and B represents a group selected from hydrogen, a halogen, a lower alkyl group having 1 to 4 carbon atoms, and a lower alkoxy group having 1 to 4 carbon atoms.

DETAILED DESCRIPTION OF THE INVENTION

The benzoxazole ring-containing dis-azo compound, which is used in this invention is represented by Formula (1)

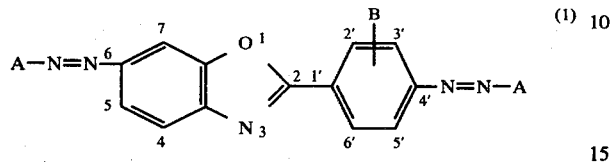

wherein A is a coupler having aromatic properties, and B is a group selected from hydrogen, a halogen, a lower alkyl group having 1 to 4 carbon atoms, and a lower alkoxy group having 1 to 4 carbon atoms.

The term "a coupler having aromatic properties" referred to herein means an aromatic coupler containing therein a phenolic hydroxy group, such as, for example, a hydroxynaphthoic acid amide type coupler, a hydroxynaphthalic acid imide type coupler and an aminonaphthol type coupler.

Preferably, A is selected from those couplers represented by Formulae (2) to (5)

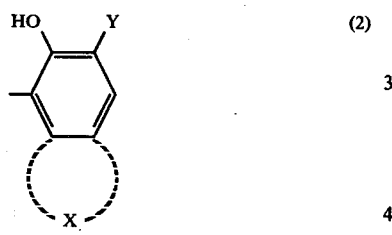

wherein X represents a group capable of being condensed with the benzene ring of Formula (2) to form a naphthalene ring, an anthracene ring, a carbazole ring or a dibenzofuran ring, and Y is —CONR$_1$R$_2$ or —COOR$_2$, wherein R$_1$ is a group selected from hydrogen, an alkyl group, and a phenyl group, and R$_2$ is a group selected from an alkyl group, a phenyl group, a naphthyl group, a pyridyl group, and a hydrazino group, each of which groups for R$_1$ and R$_2$ may be unsubstituted or substituted.

Examples of the substituents for R$_1$ and R$_2$ include an alkyl group, e.g., methyl, ethyl, etc., a halogen atom, e.g., fluorine, chlorine, etc., an alkoxy group, e.g., methoxy, ethoxy, etc., an acyl group, e.g., acetyl, benzoyl, etc., an alkylthio group, e.g., methylthio, ethylthio, etc., an arylthio group, e.g., phenylthio, etc., an aryl group, e.g., phenyl, etc., an aralkyl group, e.g., benzyl, etc., a nitro group, a cyano group, a dialkylamino group, e.g., dimethylamino, diethylamino, etc., and so forth.

_Formula (3)_

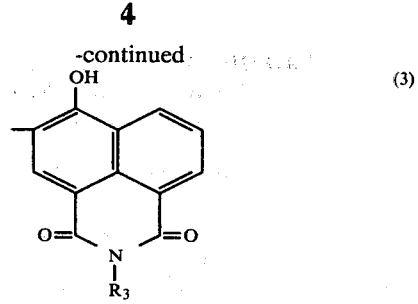

_Formula (4)_

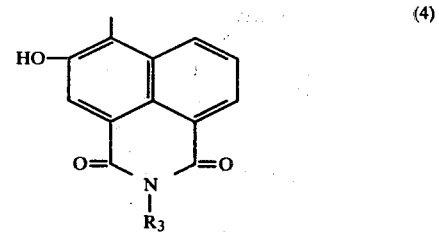

wherein R$_3$ is a substituted or unsubstituted alkyl group or a substituted or unsubstituted phenyl group.

In more detail, R$_3$ represents an alkyl group, e.g., methyl, ethyl, etc., a hydroxyalkyl group, e.g., hydroxymethyl, hydroxyethyl, etc., an alkoxyalkyl group, e.g., methoxymethyl, ethoxymethyl, ethoxyethyl, etc., a cyanoalkyl group, an aminoalkyl group, an N-alkylaminoalkyl group, an N,N-dialkylaminoalkyl group, a halogenated alkyl group, an aralkyl group, e.g., benzyl, phenethyl, etc., a phenyl group, a substituted phenyl group (examples of such substituents include those described in R$_1$ and R$_2$ of Formula (2)) or the like.

_Formula (5)_

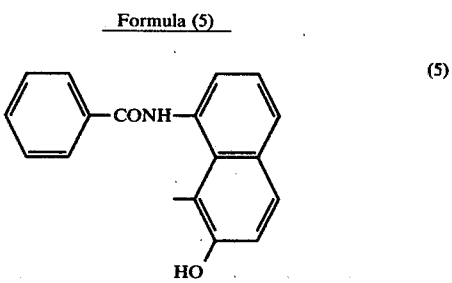

In Formula (1), B can represent hydrogen, a halogen, e.g., fluorine, chlorine, bromine, or iodine, a lower alkyl group, e.g., methyl, ethyl, propyl, etc., or a lower alkoxy group, e.g., methoxy, ethoxy, propoxy, etc.

The dis-azo compound represented by Formula (1) can easily be prepared: (a) by tetraazotizing a starting material, e.g., a diamine represented by Formula (6)

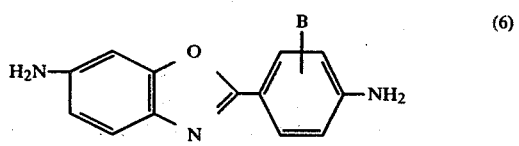

wherein B is the same as described in Formula (1), by the usual procedure (e.g., the method as described in K. H. Saunders, *The Aromatic Diazo Compounds And Their Technical Applications* (1949)) to form the corresponding tetrazonium salt and coupling the tetrazonium salt with the coupler represented by Formula (2), (3), (4), or (5) in the presence of an alkali; or (b), by isolating the tetrazonium salt of the diamine represented by Formula (6) in a boron fluoride or zinc chloride salt form, and then coupling the tetrazonium salt with the coupler represented by Formula (2), (3), (4), or (5) in a suitable solvent, e.g., N,N-dimethylformamide, dimethyl sulfoxid, etc., in the presence of an alkali.

The diamine represented by Formula (6) can be synthesized by forming a Schiff base from 5-nitro-2-aminophenol and p-nitrobenzaldehyde or its substituted compound by the usual procedure (e.g., the method as described in *J. Chem. Soc.*, pp 1722–26 (1950)), subjecting the Schiff base to the ring closure reaction using an oxidizing agent, e.g., lead tetracetate, quinones, etc., and then reducing the corresponding dinitro compound by the usual procedure (e.g., the method as described in *J. Chem. Soc.*, pp 1722–26 (1950)).

Alternatively, by forming an amide from 5-nitro-2-aminophenol and p-nitrobenzoyl chloride or its substituted compound, reducing the two nitro groups of the amide to form a diamine, and subjecting the diamine to the dehydration reaction in a solvent, e.g., polyphosphoric acid, the corresponding diamine can be synthesized.

The electrophotographic light-sensitive medium of this invention is characterized by comprising a light-sensitive layer containing therein the dis-azo compound represented by Formula (1), and its construction may be any of the types (1) to (4) as hereinbefore described, as well as in other known types. In order to increase the transport efficiency of charge carriers produced by light-absorption of the dis-azo compound represented by Formula (1), it is desirable to use the dis-azo compound in the light-sensitive medium of the type (2), (3), or (4). The most desirable structure of the light-sensitive medium in which the dis-azo compound of this invention is used is that of the type (3) in which the function of generating charge carriers and the function of transporting the charge carriers are separated, so that the characteristics of the dis-azo compound are most efficiently exhibited.

The following explanation, therefore, is provided with respect to the electrophotographic light-sensitive medium of the optimum structure, i.e., type (3).

An electrically conductive layer, a charge generation layer, and a charge transport layer are essential in the light-sensitive medium. The charge generation layer may be provided either on the charge transport layer or under the charge transport layer. In an electrophotographic light-sensitive medium of the type that it is repeatedly used, it is preferred that they are laminated in the order of the electrically conductive layer, the charge generation layer, and the charge transport layer, mainly from a viewpoint of physical strength, and in some cases from a viewpoint of charging properties. For the purpose of increasing the adhesion between the electrically conductive layer and the charge generation layer, if desired, an adhesion layer can be provided therebetween.

As the electrically conductive layer, those having a surface resistance of about $10^{10}\Omega$ or less, preferably, about $10^7\Omega$ or less, such as a metal (e.g., aluminum) plate or foil, a metal (e.g., aluminum) vapor deposited plastic film, a sheet prepared by bonding together an aluminum foil and paper, a paper rendered electrically conductive, etc., can be used.

Materials which can be effectively used in forming the adhesion layer include casein, polyvinyl alcohol, water-soluble polyethylene, nitrocellulose and the like. The thickness of the adhesion layer is from about $0.1\mu$ to $5\mu$, and preferably from about $0.5\mu$ to $3\mu$.

Fine particles of the dis-azo compound of Formula (1) are coated, if necessary after being dispersed in a suitable binder, on a charge generation layer or an adhesion layer provided on the electrically conductive layer. The dispersion of the dis-azo compound can be carried out by known methods, using a ball mill, an attritor or the like. The particle size of the dis-azo compound is usually about $5\mu$ or less and preferably about $2\mu$ or less, with the optimum particle size being $0.5\mu$ or less.

The dis-azo compound can be dissolved in an amine-based solvent, e.g., ethylenediamine and coated. The coating can be performed by known methods, such as blade coating, Meyer bar coating, spray coating, soak coating, etc.

The thickness of the charge generation layer is usually about $5\mu$ or less and preferably from about $0.01\mu$ to $1\mu$. Where a binder is used in the charge generation layer, the proportion of the binder in the charge generation layer is usually about 80% or less, and preferably about 40% or less, because if the amount of the binder is large, the sensitivity of the light-sensitive medium will be adversely affected.

Binders which can be used include polyvinyl butyral, polyvinyl acetate, polyester, polycarbonate, a phenoxy resin, an acryl resin, polyacrylamide, polyamide, polyvinyl pyridine, a cellulose resin, an urethane resin, an epoxy resin, casein, polyvinyl alcohol, etc.

In order to achieve uniform injection of charge carriers from the charge generation layer into the charge transport layer lying on the charge generation layer, if necessary, the surface of the charge generation layer can be ground and planished.

On the charge generation layer so formed is provided the charge transport layer. Where the charge transport substance has no film-forming capability, a binder is dissolved therewith in a suitable solvent and coated by the conventional method to form the charge transport layer. The charge transport substance is divided into an electron transport substance and a positive hole transport substance.

Examples of such electron transport substances include electron attractive substances such as chloranil, bromanil, tetracyanoethylene, tetracyanoquinodimethane, 2,4,7-trinitro-9-fluorenone, 2,4,5,7-tetranitrofluorenone, 2,4,7-trinitro-9-dicyanomethylenefluorenone, 2,4,5,7-tetranitroxanthone, 2,4,8-trinitrothioxanthone, etc., and their polymerization products.

Examples of positive hole transport substances include pyrene, N-ethyl carbazole, N-isopropyl carbazole, 2,5-bis(p-diethylaminophenyl)-1,3,4-oxadiazole, 1-phenyl-3-(p-diethylaminostyryl)-5-(p-diethylaminophenyl)pyrazoline, 1-(pyridyl-(2))-3-(p-diethylaminostyryl)-5-(p-diethylaminophenyl)pyrazoline, 1-(quinolyl-(2))-3-(p-diethylaminostyryl)-5-(p-diethylaminophenyl)pyrazoline, triphenylamine, poly-N-vinyl carbazole, halogenated poly-N-vinyl carbazole, polyvinyl pyrene, polyvinyl anthracene, polyvinyl acridine, poly-9-vinylphenyl anthracene, a pyrene-formaldehyde resin, an ethyl carbazole-formaldehyde resin, etc.

Charge transport substances which can be used are not limited to the above described ones, and they can be used alone or in combination with each other. The thickness of the charge transport layer is usually from about 5μ to 30μ, and preferably from about 8μ to 20μ.

Binders which can be used include an acryl resin, polystyrene, polyester, polycarbonate, etc. As the binders for low molecular weight positive hole transport substances, positive hole transport polymers such as poly-N-vinyl carbazole can be used. On the other hand, as binders for low molecular weight electron transport substances, polymers of electron transport monomers as described in U.S. Pat. No. 4,122,113 can be used.

In the light-sensitive medium comprising the electrically conductive layer, the charge generation layer on the electrically conductive layer, and the charge transport layer on the charge generation layer wherein the charge transport substance is the electron transport substance, the surface of the charge transport layer is required to be charged positively, and when the light-sensitive medium is exposed to light after charging, electrons generated in the charge generation layer are injected into the charge transport layer at exposed areas and then reach the surface of the charge transport layer, neutralizing positive charges thereon, as a result of which a decay of surface potential occurs, and electrostatic contrast is formed between exposed areas and unexposed areas. On developing the thus-formed electrostatic latent image with negatively charged toners, a visible image is obtained. This visible image can be fixed either directly or after being transferred to paper or a plastic film.

Alternatively, the electrostatic latent image may be transferred onto an insulative layer of a transfer paper, and then developed and fixed. The type of the developer, the developing method and the fixing method are not critical, and any known developer, developing method and fixing method can be employed.

On the other hand, when the charge transport layer is composed of a positive hole transport substance, the surface of the charge transport layer is required to be charged negatively, and when the light-sensitive medium is exposed to light after the charging, positive holes generated in the charge generation layer are injected into the charge transport layer at exposed areas and then reach the surface of the charge transport layer, neutralizing the negative charges, as a result of which the decay of surface potential occurs and the electrostatic contrast is formed between exposed areas and unexposed areas. In this case, therefore, it is necessary to use positively charged toners for development of electrostatic latent images.

A light-sensitive medium of type (1) according to the present invention can be obtained by dispersing the dis-azo compound of Formula (1) in an insulative binder solution as used in the charge transport layer of the light-sensitive medium of type (3) and coating the resulting dispersion on an electrically conductive support.

A light-sensitive medium of type (2) according to the present invention can be obtained by dissolving an insulative binder as used in the charge transport substance and charge transport layer of the light-sensitive medium of type (3) in a suitable solvent, dispersing the dis-azo compound of Formula (1) in a solution as above, and by coating the resulting dispersion on the electrically conductive support.

A light-sensitive medium of type (4) according to the present invention can be obtained by dispersing the dis-azo compound of Formula (1) in a solution of a charge transfer complex, which is formed on mixing the electron transport substance described in the light-sensitive medium of type (3) and the positive hole transport substance, and coating the resulting dispersion on the electrically conductive support.

In any type of light-sensitive medium according to the present invention, at least one member selected from the dis-azo compounds represented by Formula (1) is used. If desired, the dis-azo compound of Formula (1) may be used in combination with other compounds as pigments having different light absorption ranges, in order to increase the sensitivity of the light-sensitive medium. Furthermore, for the purpose of obtaining panchromatic light-sensitive media, two or more of the dis-azo compounds may be combined together, or the dis-azo compound may be used in combination with charge generating substances selected from known dyes and pigments.

The electrophotographic light-sensitive medium of this invention can be used not only in an electrophotographic copying machine, but also in other applications wherein electrophotography is utilized, such as in laser printing, CRT (cathode-ray tube) printing, etc. Hereinafter, preparation of the dis-azo compound used in this invention will be explained by reference to the preparation of examples thereof.

SYNTHESIS EXAMPLE 1

Preparation of Compound No. 1

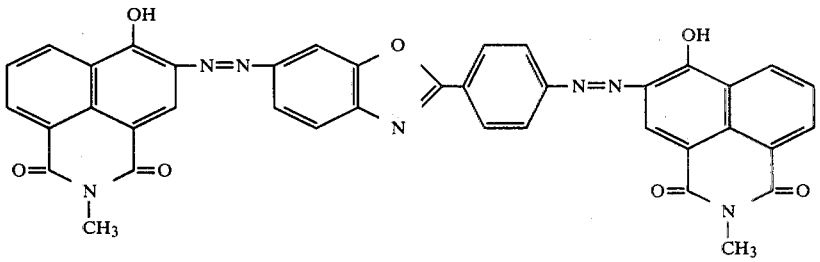

(A) Preparation of 2-p-Aminophenyl-6-aminobenzoxazole 45.64 g (0.16 mol) of 2-p-nitrophenyl-6-nitrobenzoxazole obtained by the method described in *J. Chem. Soc.*, pp 1722–6, 1950 and 280 ml of methyl cellosolve were placed in a 1-liter three-necked flask, and 8 g of 5% palladium carbon soaked in 20 ml of methyl cellosolve was added thereto. The resulting mixture was heated with stirring and raised to 50° C., and 40.07 g (0.54 mol) of 80% hydrazine hydrate was then dropwise added over a period of 30 minutes. The temperature of the resulting mixture increased to 80° C. by exothermic heat, and the mixture was maintained at that temperature for an additional 1 hour. The reaction mixture was then filtered to remove the catalyst, and the methyl cellosolve was distilled away under reduced pressure from the reaction mixture to obtain a solid portion. This

Synthesis Example 2

Preparation of Compound No. 2

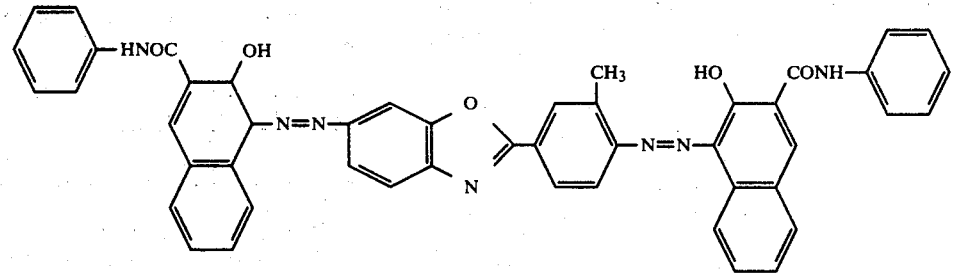

solid portion was washed with water to obtain 35.20 g of 2-p-aminophenyl-6-aminobenzoxazole ($C_{13}H_{11}N_3O$), m.p., 187°–9° C. Yield, 98%.

Elemental Analysis for $C_{13}H_{11}N_3O$: Calculated C, 69.30%; H, 4.93%; N, 18.66%: Found C, 69.08%; H, 4.98%; N, 18.69%.

(B) Synthesis of Compound No. 1

6.76 g (0.03 mol) of 2-p-aminophenyl-6-aminobenzoxazole, 41 ml of water, and 18.24 g (0.18 mol) of concentrated hydrochloric acid were placed in a 200 ml beaker, and the temperature of the mixture was maintained at 4° C. by cooling in an ice water bath. A solution prepared by dissolving 4.35 g (0.063 mol) of sodium nitrite in 9 ml of water was dropwise added while stirring the diamine dispersion and controlling the temperature of the mixture within the range of from 4° C. to 10° C. After the reaction was completed, the reaction mixture was stirred at that temperature for an additional 30 minutes. To the reaction mixture was added carbon, and the resulting mixture was filtered to obtain a tetrazonium salt solution.

Next, 600 ml of water was placed in a 2-liter beaker, and after dissolving 27.98 g (0.264 mol) of sodium carbonate in the water, 15.00 g (0.066 mol) of 4-hydroxynaphthalic acid methylimide was added and dissolved therein. The above prepared tetrazonium salt solution was added to the thus-obtained coupler solution with stirring over a period of 30 minutes while controlling the temperature of the coupler solution within the range of 5° C. to 10° C. by cooling in an ice water bath. At the end of the time, the ice water bath was removed, and the resulting mixture was stirred at room temperature for an additional 2 hours, and then allowed to stand overnight.

The reaction solution was filtered to obtain a pigment portion. This pigment portion was washed with water and then with acetone, and furthermore heat-filtered using 400 ml of methyl cellosolve to obtain 18.00 g of a crude pigment. Thereafter, the crude pigment was heat-filtered five times with 400 ml portions of DMF (dimethylformamide) and dried in vacuo by heating to obtain 15.85 g of Compound No. 1. Decomposition point, more than 300° C.; yield, 75%.

Visible Absorption Spectrum:
Maximum absorption wavelength, 558 nm (trichlorobenzene solution)
IR Absorption Spectrum:
Imide, 1655 cm$^{-1}$, 1695 cm$^{-1}$.

(A) Preparation of 6-Amino-2-(3'-methyl-4'-aminophenyl)benzoxazole 35 ml of phosphoric acid and 54 g of phosphorus pentoxide were placed in a 200-ml three-necked flask and stirred at 100° C. for 2 hours to form polyphosphoric acid. To the polyphosphoric acid so formed were added small portions of 16.73 g (0.065 mol) of 6-amino-2-(3'-methyl-4'-aminobenzoylamido)phenol powder over a period of 10 minutes. The resulting mixture was then raised to 140° C. over a period of 20 minutes, and reacted at that temperature for 3 hours. The reaction mixture was then cooled to 80° C. and poured into 1 liter of ice water, to precipitate a solid portion. The solid portion was filtered off, introduced into 500 ml of a 5% aqueous solution of sodium carbonate, stirred, filtered off, and washed with water to obtain 10.28 g of a grey solid portion having a melting point of 176°–181° C. The filtrate, which had been obtained when the polyphosphoric acid solution was poured into ice water and filtered, was neutralized with caustic soda and then filtered off, washed with water, and dried, whereupon 1.17 g of a red-purple solid portion which had a melting point of 182°–5° C. was obtained.

The thus-obtained two solid portions were combined together and recrystallized from 220 ml of xylene using carbon to obtain 7.10 g of pale beige crystals having a melting point of 188°–9° C. Yield, 46%. Crystals which were obtained by recrystallizing from xylene once more had the same melting point as above.

Elemental Analysis for $C_{13}H_{13}N_3O$: Calculated C, 70.26%; H, 5.49%; N, 17.56%: Found C, 70.31%; H, 5.40%; N, 17.49%.

Infrared Absorption Spectrum

The absorption at 1665 cm$^{-1}$ (amido) of the starting material completely disappeared.

(B) Synthesis of Compound No. 2

80 ml of water, 16.6 ml (0.19 mol) of concentrated hydrochloric acid and 7.0 g (0.029 mol) of 6-amino-2-(3'-methyl-4'-aminophenyl)benzoxazole were placed in a 500-ml flask and the temperature of the mixture was lowered to 3° C. by stirring while cooling in an ice water bath. Then, a solution prepared by dissolving 4.2 g (0.061 mol) of sodium nitrite in 7 ml of water was dropwise added to the above mixture over a period of 10 minutes while controlling the temperature within the range of from 3° C. to 10° C. After the dropwise addition was completed, the resulting mixture was stirred at that temperature for an additional 30 minutes. Carbon was added to the reaction mixture, and the resulting mixture was filtered to obtain a tetrazonium salt solution.

Next, 700 ml of water was placed in a 2-liter beaker, and after dissolving 21 g (0.53 mol) of caustic soda in the water, 16.2 g (0.061 mol) of Naphthol AS (3-hydroxy-2-naphthoic acid anilide) was added and dissolved therein.

The thus-obtained coupler solution was cooled to 6° C., and the above obtained tetrazonium salt solution was dropwise added to the coupler solution with stirring over a period of 30 minutes while controlling the temperature of the resulting mixture within the range of from 6° C. to 10° C. The resulting mixture was then stirred at room temperature for 2 hours and then allowed to stand overnight. The reaction solution was filtered to obtain a solid portion which was then washed with water to obtain 21 g of a crude pigment. The crude pigment was heat-filtered five times with 400 ml portions of DMF and then dried by heating under reduced pressure to obtain 16.5 g of Compound No. 2. Yield, 72%. The decomposition point was more than 300° C.

| Visible Absorption Spectrum | |
|---|---|
| Maximum Absorption Wavelength | 600 nm |
| | 569 nm (o-dichlorobenzene solution) |

IR Absorption Spectrum:
Amide 1670 cm$^{-1}$

Other dis-azo compounds represented by Formula (1) can be synthesized in an analogous manner to the two Synthesis Examples described above.

The following Examples of electrophotographic media are provided to illustrate this invention in greater detail.

EXAMPLES 1 AND 2

An aqueous ammonia solution of casein (casein 11.2 g, 28% aqueous ammonia 1 g and water 222 ml) was coated on an aluminum plate with a Meyer bar and dried to form an adhesion layer of a coating amount of 1.0 g/m$^2$.

Next, 5 g of Compound No. 1 (in this case referred to as Example 1) and a solution prepared by dissolving 2 g of a butyral resin (degree of butyralation, 63 mol %) in 95 ml of ethanol were ball-milled for 40 hours, and the dispersion so obtained was coated on the adhesion layer with a Meyer bar and dried to form a charge generation layer of a coating amount of 0.2 g/m$^2$.

A solution of 5 g of 1-phenyl-3-(p-diethylaminostyryl)-5-(p-diethylaminophenyl)pyrazoline and 5 g of poly-4,4'-dioxydiphenyl-2,2-propanecarbonate (molecular weight, 30,000) in 70 ml of tetrahydrofuran was coated on the charge generation layer prepared above and dried to form a charge transport layer of a coating amount of 10 g/m$^2$.

A case wherein Compound No. 2 was used in place of Compound No. 1 is referred to herein as Example 2.

The thus-obtained two electrophotographic light-sensitive media were conditioned at 20° C. and 65% (relative humidity) for 24 hours, corona-charged at −5 KV with an electrostatic copying paper testing apparatus, Model SP-428 produced by Kawaguchi Denki Co., Ltd., according to the static method, and held in a dark place for 10 seconds. Then they were exposed to light at an intensity of illumination of 5 lux, and their charging characteristics were examined.

The results are shown in Table 1 wherein $V_o$ (−v), $V_k$ (%) and E ½ (lux.sec) indicate, respectively, the initial potential, the potential retention in a dark place for the period of 10 seconds, and the exposure amount for half decay.

TABLE 1

| Example | Compound | $V_o(-v)$ | $V_k$ (%) | E ½ (lux . sec) |
|---|---|---|---|---|
| 1 | No. 1 | 490 | 84 | 7.3 |
| 2 | No. 2 | 540 | 85 | 4.3 |

The light-sensitive media of Examples 1 and 2 had all good chargeability and potential retention and had excellent properties in sensitivity.

EXAMPLE 3

On a charge generation layer prepared as in Example 1 was coated a solution of 5 g of triphenylamine and 5 g of poly-N-vinyl carbazole (molecular weight, 300,000) in 70 ml of tetrahydrofuran with a Meyer bar so that the coating amount after drying was 12 g/m$^2$.

The thus-obtained light-sensitive medium was measured in charging characteristics in the same manner as in Example 1, and the results are as follows:
$V_o$ −600 v
$V_k$ 91%
E ½ 18 lux.sec

EXAMPLE 4

On a charge generation layer prepared as in Example 2 was coated a solution of 5 g of 2,5-bis(p-diethylaminophenyl)-1,3,4-oxadiazole and 5 g of the same polycarbonate as used in Example 1 in 70 ml of tetrahydrofuran with a Meyer bar so that the coating amount after drying was 11 g/m$^2$.

The thus-obtained light-sensitive medium was measured in charging characteristics in the same manner as in Example 1. The results are as follows:
$V_o$ −560 v
$V_k$ 94%
E ½ 4.3 lux.sec

EXAMPLE 5

On a charge generation layer prepared as in Example 2 was coated a solution of 5 g of 2,4,7-trinitrofluorenone and 5 g of the same polycarbonate as used in Example 1 in 70 ml of tetrahydrofuran with a Meyer bar so that the coating amount after drying was 12 g/m$^2$.

The thus-obtained light-sensitive medium was measured in charging characteristics in the same manner as in Example 1. The results are as follows:
$V_o$ +600 v
$V_k$ 94%
E ½ 18 lux.sec
In this case, the charging polarity was positive.

EXAMPLE 6

On a charge generation layer prepared as in Example 2 was coated a solution of 5 g of 1-(quinolyl-(2))-3-(p-diethylaminostyryl)-5-(p-diethylaminophenyl)pyrazoline and 5 g of a polymethyl methacrylate resin (molecular weight, 100,000) in 70 ml of tetrahydrofuran with a Meyer bar so that the coating amount after drying was 10 g/m$^2$.

The thus-obtained light-sensitive medium was measured in charging characteristics in the same manner as in Example 1. The results are as follows:

$V_o$ −540 v
$V_k$ 95%
$E_{\frac{1}{2}}$ 4.3 lux.sec

Next, the same light-sensitive medium as prepared above was conditioned at 50° C. and 80% (relative humidity) for 24 hours and then measured in charging characteristics in the same manner as in Example 1. The results are as follows:

$V_o$ −520 v
$V_k$ 92%
$E_{\frac{1}{2}}$ 4.5 lux.sec

The charging characteristics of the light-sensitive medium were stable against temperature and moisture, and no changes in the coating films occurred. It was thus confirmed that the light-sensitive medium was excellent.

EXAMPLE 7

A solution of 5 g of the same polycarbonate as used in Example 1 and 5 g of 1-(pyridyl-(2))-3-(p-diethylaminostyryl)-5-(p-diethylaminophenyl)pyrazoline in 60 ml of tetrahydrofuran, and 1.0 g of Compound No. 1 were ball-milled for 40 hours, and the resulting dispersion was coated on the same adhesion layer-bearing aluminum plate as used in Example 1 at the side of the adhesion layer and dried to form 10 g/m² of a light-sensitive layer.

The thus-obtained light-sensitive medium was measured in charging characteristics in the same manner as in Example 1. The results are shown below:

$V_o$ +465 v
$V_k$ 86%
$E_{\frac{1}{2}}$ 18.8 lux.sec

EXAMPLES 8 TO 34

5 g of a dis-azo compound (A and B of Formula (1) are shown in Table 2), 10 g of a polyester resin solution (Polyester Adhesive 49000, produced by E. I. du Pont; solid content, 20%) and 80 ml of tetrahydrofuran were ball-milled for 60 hours, and the resulting dispersion was coated on an aluminum-deposited Mylar (trademark of E. I. du Pont for polyethylene terephthalate) film at the side of the aluminum surface with a Meyer bar so that the coating amount after drying was 0.3 g/m².

Next, a solution of 5 g of 1-phenyl-3-(p-diethylaminostyryl)-5-(p-diethylaminophenyl)pyrazoline, and 5 g of the same polycarbonate as used in Example 1 in 70 ml of tetrahydrofuran was coated on the charge generation layer prepared above with a Baker applicator and dried to form 10 g/m² of a charge transport layer.

The thus-obtained light-sensitive media were measured in charging characteristics in the same manner as in Example 1. The results are shown in Table 2.

TABLE 2

| Example | Compound No. | Dis-azo Compound B | Dis-azo Compound A | $V_o$ (−v) | $V_k$ (%) | $E_{\frac{1}{2}}$ (lux . sec) |
|---|---|---|---|---|---|---|
| 8 | 3 | H | HO, CONH—phenyl (naphthalene) | 560 | 94 | 4.3 |
| 9 | 4 | H | HO, CONH—phenyl-NO₂ (naphthalene) | 520 | 90 | 5.3 |
| 10 | 5 | H | HO, CONH—phenyl-OCH₃ (naphthalene) | 555 | 96 | 5.8 |
| 11 | 6 | H | HO, CONH—phenyl(OCH₃, Cl, OCH₃) (naphthalene) | 510 | 99 | 6.0 |

TABLE 2-continued

| Example | Compound No. | Dis-azo Compound B | Dis-azo Compound A | $V_o$ (−v) | $V_k$ (%) | $E_{1/2}$ (lux · sec) |
|---|---|---|---|---|---|---|
| 12 | 7 | H | 3-hydroxy-4-methyl-2-naphthoic acid 4-chloroanilide | 570 | 90 | 5.9 |
| 13 | 8 | H | 3-hydroxy-4-methyl-2-naphthoic acid 4-bromoanilide | 565 | 89 | 5.6 |
| 14 | 9 | H | 3-hydroxy-4-methyl-2-naphthoic acid 2,4-dimethylanilide | 510 | 89 | 6.2 |
| 15 | 10 | H | 3-hydroxy-4-methyl-2-naphthoic acid 4-(N,N-diethylamino)anilide | 490 | 84 | 5.8 |
| 16 | 11 | H | 3-hydroxy-4-methyl-2-naphthoic acid 2-hydroxyethylamide | 480 | 80 | 12 |
| 17 | 12 | H | 3-hydroxy-4-methyl-2-naphthoic acid 1-naphthylamide | 560 | 90 | 6.5 |
| 18 | 13 | H | 3-hydroxy-4-methyl-2-naphthoic acid 2-naphthylamide | 505 | 86 | 6.7 |
| 19 | 14 | H | 3-hydroxy-4-methyl-2-naphthoic acid N-ethyl-N-phenylamide | 550 | 90 | 8.0 |
| 20 | 15 | H | 3-hydroxy-4-methyl-2-naphthoic acid N,N-diphenylamide | 540 | 87 | 6.2 |

TABLE 2-continued
| Example | Compound No. | Dis-azo Compound B | A | $V_o$ (−v) | $V_k$ (%) | $E_{\frac{1}{2}}$ (lux · sec) |
|---|---|---|---|---|---|---|
| 21 | 16 | H | 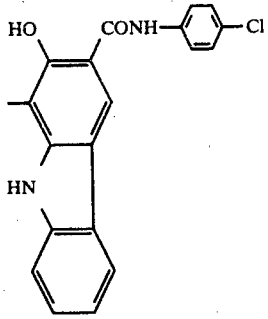 | 560 | 93 | 5.5 |
| 22 | 17 | H | 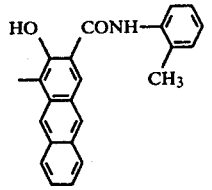 | 580 | 90 | 6.5 |
| 23 | 18 | H | 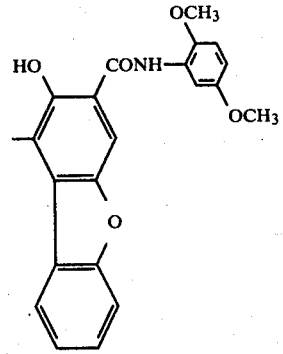 | 565 | 85 | 6.9 |
| 24 | 19 | H | 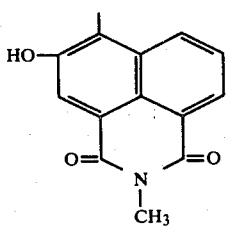 | 590 | 90 | 7.5 |
| 25 | 20 | 3'-CH₃ | 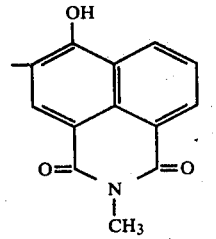 | 565 | 87 | 6.9 |
| 26 | 21 | 3'-CH₃ | 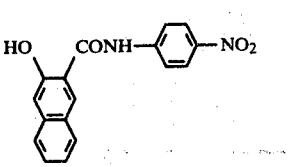 | 500 | 84 | 6.7 |

TABLE 2-continued

| Example | Compound No. | Dis-azo Compound B | Dis-azo Compound A | $V_o$ (−v) | $V_k$ (%) | E ½ (lux · sec) |
|---|---|---|---|---|---|---|
| 27 | 22 | 3'-CH₃ | (HO, CONH–C₆H₄–Cl, CH₃, HN–phenyl structure) | 580 | 89 | 6.6 |
| 28 | 23 | 2'-Cl | (3-hydroxy-4-methyl-2-naphthanilide) | 580 | 88 | 7.5 |
| 29 | 24 | 3'-OCH₃ | (3-hydroxy-4-methyl-2-naphthanilide) | 540 | 87 | 6.0 |
| 30 | 25 | H | (3-hydroxy-4-methyl-2-naphthoic acid phenyl ester) | 570 | 91 | 10.0 |
| 31 | 26 | 3'-OC₂H₅ | (3-hydroxy-4-methyl-2-naphthanilide) | 550 | 90 | 5.3 |
| 32 | 27 | H | (3-hydroxy-4-methyl-N-(3-pyridyl)-2-naphthamide) | 540 | 92 | 13.0 |
| 33 | 28 | H | (3-hydroxy-4-methyl-N,N-diphenylhydrazide of 2-naphthoic acid) | 570 | 91 | 12.4 |
| 34 | 29 | H | (8-(phenoxyformamido)-2-methyl-3-hydroxynaphthalene) | 560 | 93 | 7.0 |

EXAMPLE 35

20 g of poly-N-vinyl carbazole (molecular weight, 300,000), 3.2 g of 2,4,7-trinitrofluorenone, 10 g of a polyester resin solution (Polyester Adhesive 49000, produced by E. I. du Pont; solid content, 20%), 2.0 g of Compound No. 2 and 180 ml of tetrahydrofuran were charged to a ball-mill and dispersed for 40 hours. The dispersion so obtained was coated on an aluminum-deposited Mylar film at the side of the aluminum surface with a Baker applicator so that the coating amount after drying was 12 g/m².

The thus-obtained light-sensitive medium was measured in charging characteristics in the same manner as in Example 1. The results are as follows:

$V_o$ +480 v
$V_k$ 80%
E ½ 16 lux.sec

In this case, the charging polarity was positive.

EXAMPLE 36

On an aluminum drum surface there were coated by the dipping method an adhesion layer, a charge generation layer, and a charge transport layer as in Example 6, to prepare a light-sensitive medium.

The thus-obtained drum was mounted on a PPC copying machine (testing apparatus) (produced by Copyer Co., Ltd.) in which a two component developer was used. The surface potential was set to −600 v, and 20,000 copies were produced. During this time, the variation in the surface potential was 50 v or less, no changes in sensitivity occurred, and excellent quality copies were obtained.

While the invention has been described in detail and with reference to specific embodiments thereof, it will be apparent to one skilled in the art that various changes and modifications can be made therein without departing from the spirit and scope thereof.

What is claimed is:

1. An electrophotographic light-sensitive medium comprising a light-sensitive layer containing a dis-azo compound represented by the Formula (1)

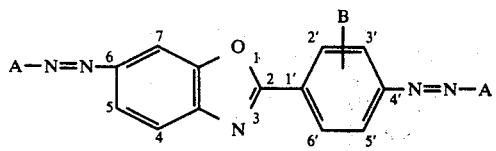

wherein A is an aromatic coupler containing therein a phenolic hydroxy group, and B is selected from the group consisting of hydrogen, a halogen, a lower alkyl group having 1 to 4 carbon atoms, and a lower alkoxy group having 1 to 4 carbon atoms.

2. An electrophotographic light-sensitive medium as in claim 1, wherein A is represented by Formula (2)

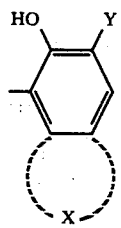

wherein X is a group capable of being condensed with the benzene ring of Formula (2) to form a naphthalene ring, an anthracene ring, a carbazole ring or a dibenzofuran ring, and Y is —CONR₁R₂ or —COOR₂, wherein $R_1$ is selected from the group consisting of hydrogen, a substituted or unsubstituted alkyl group, and a substituted or unsubstituted phenyl group, and $R_2$ is selected from the group consisting of a substituted or unsubstituted alkyl group, a substituted or unsubstituted phenyl group, a substituted or unsubstituted naphthyl group, a substituted or unsubstituted pyridyl group, and a diphenylamino group.

3. An electrophotographic light-sensitive medium as in claim 1, wherein A is represented by Formula (3) or Formula (4)

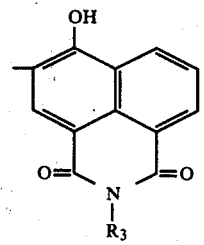

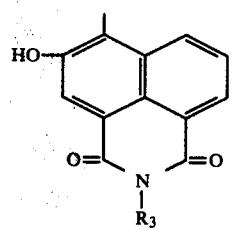

wherein $R_3$ is selected from the group consisting of a substituted or unsubstituted alkyl group and a substituted or unsubstituted phenyl group.

4. An electrophotographic light-sensitive medium as in claim 3, wherein when A is represented by Formula (3), $R_3$ is a substituted or unsubstituted alkyl group.

5. An electrophotographic light-sensitive medium as in claim 1, wherein A is represented by Formula (5)

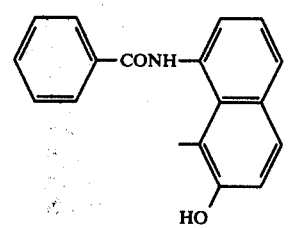

6. An electrophotographic light-sensitive medium as in claim 1, wherein the dis-azo compound is represented by the formula

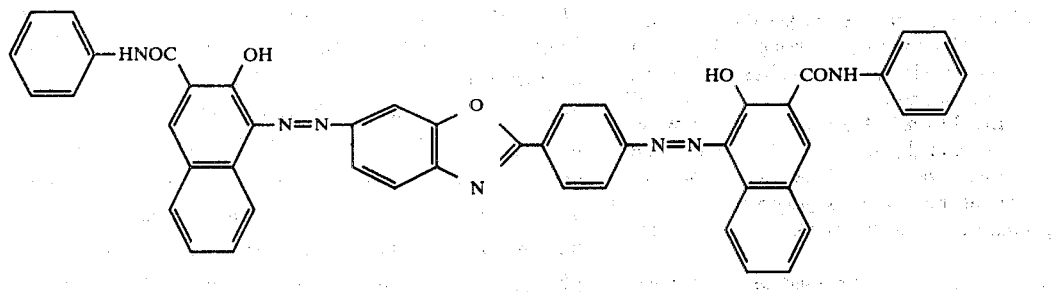

7. An electrophotographic light-sensitive medium as in claim 1, wherein the dis-azo compound is represented by the formula

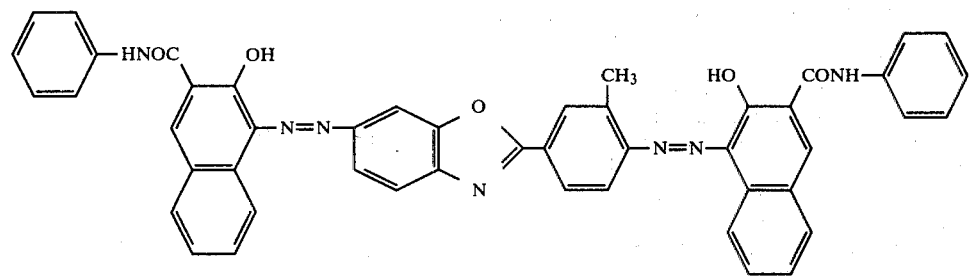

8. An electrophotographic light-sensitive medium as in claim 1, wherein the dis-azo compound is represented by the formula

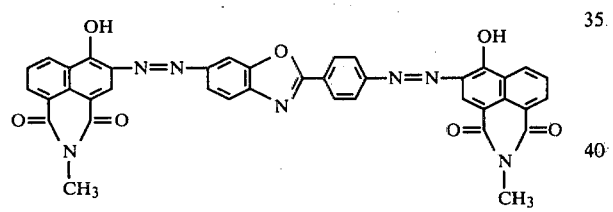

9. An electrophotographic light-sensitive medium as in claim 1, 2, 3, 4, 5, 6, 7, or 8, wherein the light-sensitive medium comprises an electrically conductive layer, a light-sensitive charge generation layer containing the dis-azo compound, and a charge transport layer.

10. An electrophotographic light-sensitive medium as in claim 9, wherein the layers are laminated in the order of the electrically conductive layer, the charge generation layer, and the charge transport layer.

11. An electrophotographic light-sensitive medium as in claim 9, wherein the thickness of the charge generation layer is about 5μ or less.

12. An electrophotographic light-sensitive medium as in claim 9, wherein the thickness of the charge generation layer is from about 0.01μ to 1μ.

13. A dis-azo compound represented by Formula (1)

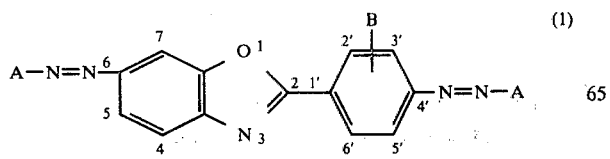

wherein A is represented by Formula (2), Formula (3), Formula (4), or Formula (5):

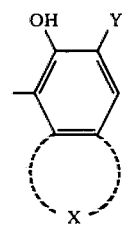

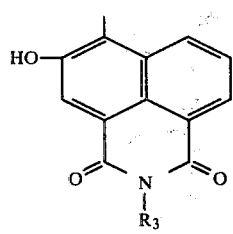

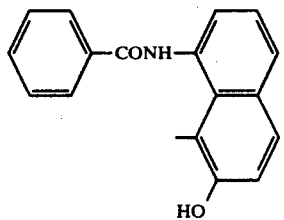

wherein X is a group capable of being condensed with the benzene ring of Formula (2) to form a naphthalene ring, an anthracene ring, a carbazole ring and a dibenzofuran ring, Y is —CONR$_1$R$_2$ or —COOR$_2$, wherein R$_1$ is selected from the group consisting of hydrogen, a substituted or unsubstituted alkyl group, and a substituted or unsubstituted phenyl group, and R$_2$ is selected from the group consisting of a substituted or unsubstituted alkyl group, a substituted or unsubstituted phenyl group, a substituted or unsubstituted naphthyl group, a substituted or unsubstituted pyridyl group and a diphenylamino group, R$_3$ is selected from a group consisting of a substituted or unsubstituted alkyl group and a substituted or unsubstituted phenyl group, and B is selected from the group consisting of hydrogen, a halogen, a lower alkyl group having 1 to 4 carbon atoms, and a lower alkoxy group having 1 to 4 carbon atoms.

14. A dis-azo compound as in claim 13, wherein said dis-azo compound is represented by the formula

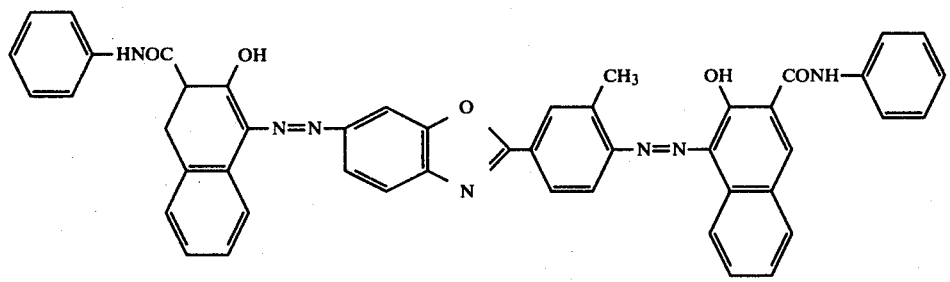

15. A dis-azo compound as in claim 13, wherein said dis-azo compound is represented by the formula

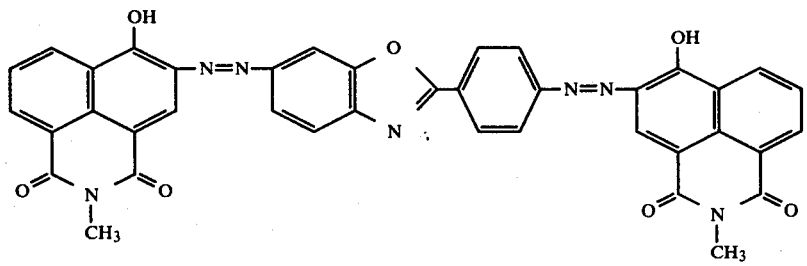

16. A dis-azo compound as in claim 13, wherein said dis-azo compound is represented by the formula

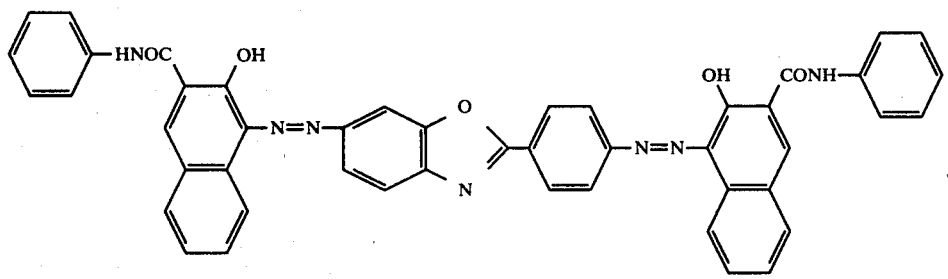

* * * * *